Figure 1:
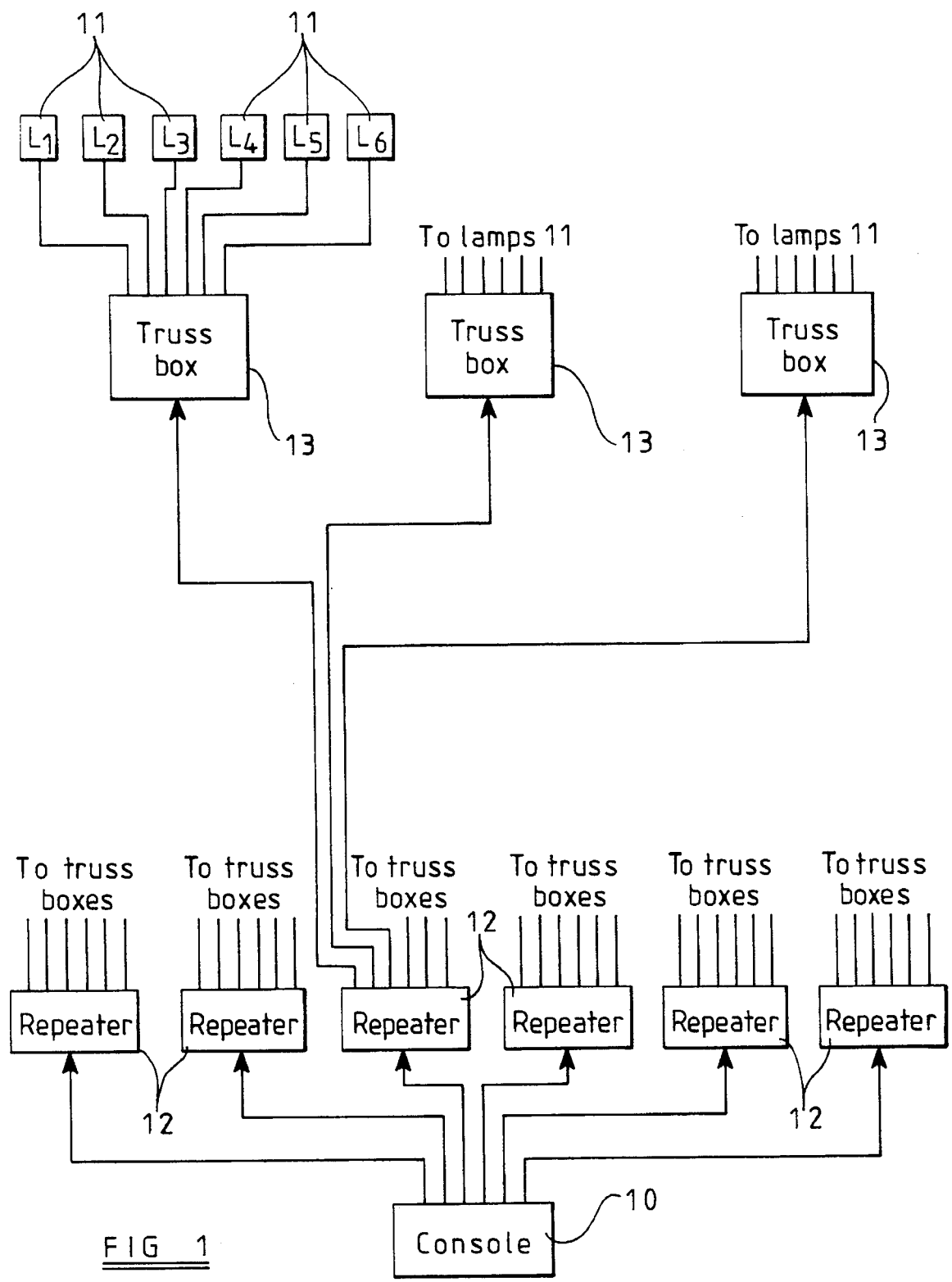

United States Patent [19]

Hunt et al.

[11] Patent Number: 5,588,021

[45] Date of Patent: Dec. 24, 1996

[54] REPEATER FOR USE IN A CONTROL NETWORK

[75] Inventors: Mark A. Hunt, Derby; Andrew Murray, Sutton Coldfield, both of United Kingdom

[73] Assignee: Light & Sound Design Limited, Edinburgh, United Kingdom

[21] Appl. No.: 80,717

[22] Filed: Jun. 24, 1993

[30] Foreign Application Priority Data

Sep. 25, 1992 [GB] United Kingdom ............. 9220308
Apr. 20, 1993 [GB] United Kingdom ............. 9308069

[51] Int. Cl.$^6$ ............................. H04B 17/02; H04B 1/38
[52] U.S. Cl. .................... 375/211; 375/213; 375/220; 370/246
[58] Field of Search ....................... 370/75, 97, 112, 370/13.1, 35; 328/105; 375/3, 7, 211, 213, 219, 220; 455/15, 16, 17; H04B 17/02

[56] References Cited

U.S. PATENT DOCUMENTS

| 4,912,723 | 3/1990 | Verbanets, Jr. ........................ 375/7 |
|---|---|---|
| 5,010,459 | 4/1991 | Taylor et al. ........................ 362/85 |
| 5,119,398 | 6/1992 | Webber, Jr. ........................ 375/7 |
| 5,125,006 | 6/1992 | Marinaro ........................ 375/7 |
| 5,209,560 | 5/1993 | Taylor et al. ........................ 362/85 |
| 5,329,431 | 7/1994 | Taylor et al. ........................ 362/85 |

*Primary Examiner*—Kim Yen Vu
*Assistant Examiner*—Madeleine A.V. Nguyen
*Attorney, Agent, or Firm*—Fish & Richardson P.C.

[57] ABSTRACT

A repeater for use in a control network includes isolating transformers at its root input/output and at a plurality of branch input/outputs. There is a line receiver and a line driver circuit associated with each of the isolating transformers. To determine the direction of transmission of signals through the repeater, there is a common mode voltage detector which detects a common mode voltage imposed on the wiring to the root side of the root transformer. A corresponding common mode voltage is imposed by the repeater on the branch side of each of the branch transformers. The repeater also includes a logic circuit for testing the validity of signals received from the branches and ensuring that only valid signals are passed to the root transformer.

5 Claims, 3 Drawing Sheets

REPEATER FOR USE IN A CONTROL NETWORK

This invention relates to a repeater for use in a control network. The repeater is of particular utility in a stage lighting control network, but is also usable in other applications.

In a stage lighting control network a branching or tree topology is preferable to a ring or star topology, but noise problems caused by repeated division of control signals flowing outwardly from the main station along the tree to the lamp stations arise and there is also a problem concerning the routing of signals flowing inwardly from the lamp stations to the main console.

It is an object of the present invention to provide a repeater for use in dividing control signals into a plurality of branches whilst avoiding noise problems and also enabling routing of signals from outstations to a main control station.

A repeater in accordance with the invention comprises a root input/output isolating transformer, a plurality of branch input/output isolating transformers, a line receiver circuit and a line driver circuit associated with each of said isolating transformers, common voltage detector means for detecting a common voltage at the root side of said root isolating transformer, common voltage applying means for applying to the branch side of each of the branch isolating transformers a common mode voltage determined by said common voltage detector means, normal data flow enabling means for enabling the line receiver circuit associated with the root isolating transformer and the line driver circuit associated with the branch isolating transformers when a normal common mode voltage is detected, so that data signals received by the root isolating transformer are transmitted from each of the branch isolating transformers, reverse data flow enabling means for enabling the line receivers associated with the branch isolating transformers when a different common mode voltage is detected, a data signal discriminating means for detecting the presence of valid data signals at the output of any one of the line receivers associated with the branch isolating transformers, and means for enabling the line transmitter associated with root isolating transformer when such valid data signals are detected and for routing to it the output of the one of the line receivers at which valid data signals have been detected.

Figure 2:
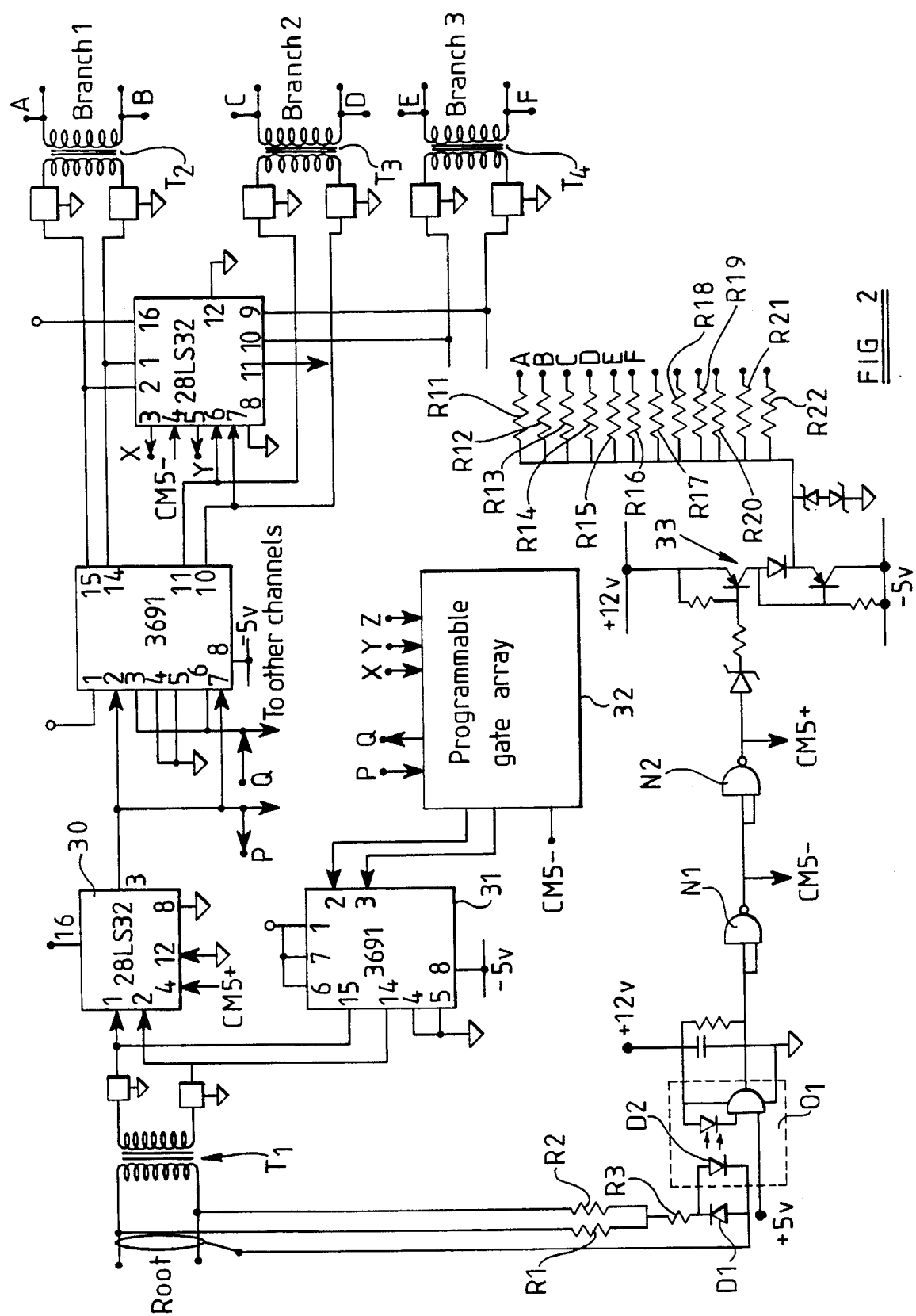
Figure 3:
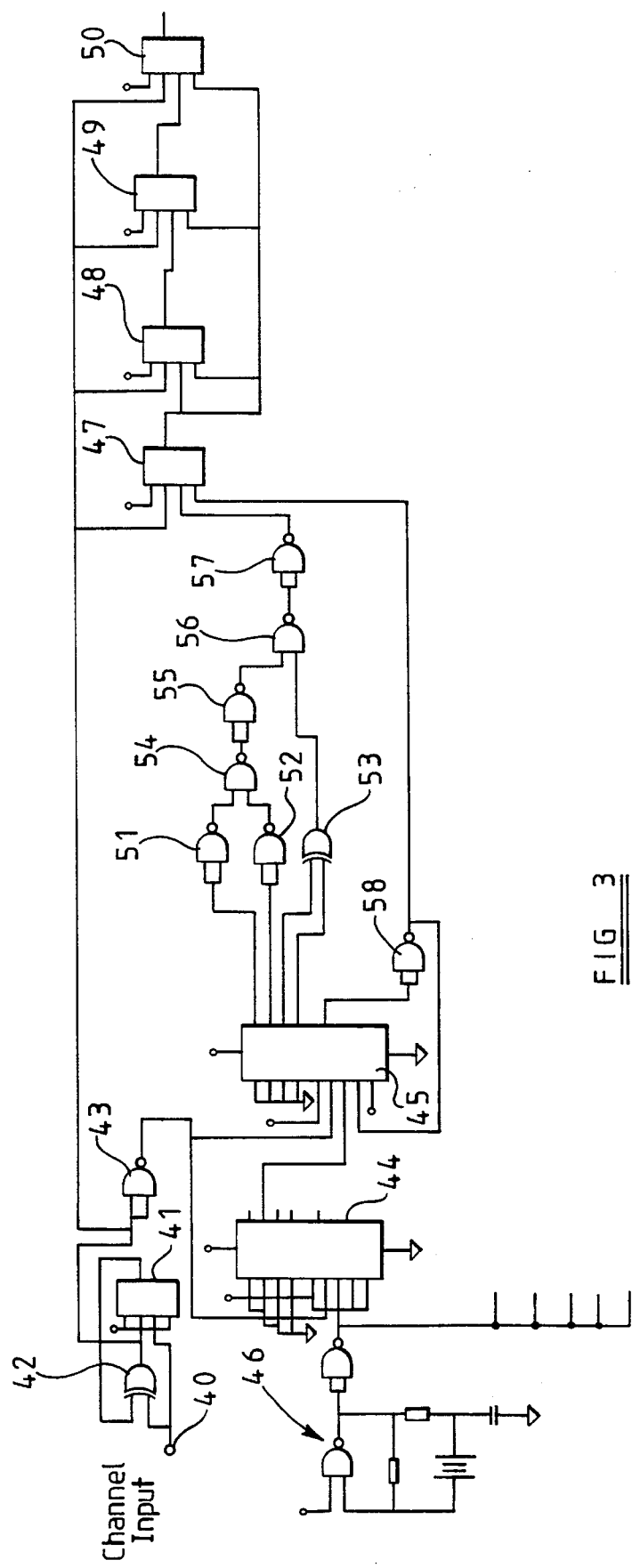

An example of the invention is shown in the accompanying drawings in which FIG. 1 is a schematic diagram of a control network for controlling stage lighting, FIG. 2 is a schematic circuit diagram of a repeater which is used in the network of FIG. 1 and FIG. 3 is the schematic circuit diagram of a signal validity checker included in the circuit of FIG. 2.

The network connects a control console 10 to a plurality of lamps 11. The control console 10 has various manually actuable input devices which provide inputs to a micro-computer and displays driven by the micro-computer. There is an associated hard disk drive which can be used to store sequences of operations, for transmission over the network. The micro-computer includes a serial communication controller based on a Zilog Z8530 integrated circuit set up to operate in FM0 mode using the SDLC communication protocols.

Each of the lamps also includes a micro-processor with a Z8530 serial communication controller. The micro-processor receives commands from the network and controls a plurality of individual functions of the lamp, such as azimuth and elevation angles, colour control, gobo selection and rotation and others. Each lamp micro-processor has its program in ROM which also stores data uniquely identifying the lamp and its type.

The network is used mainly for the transmission of commands from the console micro-computer to the micro-processors in the lamps, but there is occasionally a need for data to be transmitted in the opposite direction, for example during set-up, when each lamp is required to inform the console of its unique identification data and its type code. This can be accomplished by having the console micro-computer broadcast a request to all the lamps. The lamp micro-processors respond by transmitting back the requested data after a delay dependent on the identification data. The lamps thus transmit their data in different time slots, enabling the console micro-computer to receive the data over a period.

The communication controllers of the console and the individual lamps each have an isolating transformer providing the path for two-way communication with the network cabling and the console microcomputer can impress a common mode voltage on the cabling to indicate whether it is currently operating in transmit mode or receive mode. A negative voltage relative to ground indicates that the console is transmitting, a positive common mode voltage indicating that it is ready to receive.

The network is configured as a multi-branched tree. The console has outputs connected to the "root" side of up to six repeaters 12 which split transmitted data signals between six branches or selectively routes data from the branches to the root. Each repeater branch can drive up to six lamp units 11 and connections to these are made via truss boxes 13 which simply split the incoming signals into six branches in parallel. The truss boxes 13 are also used in the distribution of electrical power to the lamp units. Where there are six repeaters as shown, six truss boxes per repeater and six lamp units per truss box, a maximum of 216 lamp units can be controlled. If an even larger number of lamp units is required for a particular set-up, additional repeaters can be employed, so that, for example, one or each of the repeaters 12 shown drives six further repeaters each of which drives 36 lamps via six truss boxes. A system employing six first level repeaters and thirty six second level repeaters can support up to 1296 lamp units.

The repeater is shown in more detail in FIG. 2. The repeater includes a root input/output isolating transformer $T_1$ and six branch input/output isolating transformers of which three $T_2$, $T_3$ and $T_4$ are shown. The repeater side of transformer $T_1$ is connected to the inputs of a line receiver 30 (one quarter of an i.c. type 28LS32) and to the balanced outputs of a line driver 31 (one half of an i.c. type 3691). A logic circuit 32 to be described in more detail hereinafter controls an enable input of the line driver 31 and also controls routing of data signals from one of the branch transformers. The receiver 30 also has an enable terminal which is controlled by a common mode voltage detecting circuit.

This common mode voltage detecting circuit includes a pair of resistors $R_1$, $R_2$ connected to the cable side of the root transformer $T_1$. These resistors $R_1$ and $R_2$ are connected together and their common point is connected by a resistor $R_3$ to the cathode of a diode $D_1$, the anode of which is connected to the grounded screening of the network cable. The light emitting diode $D_2$ of an opto-isolator $D_0$ is connected across the diode $D_1$ so that it conducts when the common mode voltage is positive, but is turned off when such voltage is negative. The output of the opto-isolator is connected to both inputs of a NAND gate $N_1$ the output of which is connected to both inputs of a second NAND gate N₂. The output of gate N₁ is shown connected to a terminal marked CM5– and the output of gate N₂ is similarly connected to a terminal marked CM5+. The voltage at terminal CM5– is high only when the common mode voltage is negative and that at terminal CM5+ is high whenever the common mode voltage is positive. The enable terminal of the receiver is connected to terminal CM5+ so that receiver 30 is enabled only when the detected common mode voltage is positive.

Each of the branch isolating transformers $T_2$, $T_3$ etc. has an associated line driver and an associated receiver. For this purpose there are three further 3691 integrated circuits and two further 28LS32 integrated circuits. FIG. 2 shows three of the branch isolating transformers which are associated with three receivers sharing a 28LS32 integrated circuit. Two of these transformers are associated with drivers sharing a 3691 integrated circuit. The other three transformers, the other 28LS32ic and the other two 3691 integrated circuits are not shown. Three output terminals (labelled X, Y & Z) of the 28LS32 i.c. are connected to inputs of the logic circuit 32. The two data inputs (pins 2 and 7) of the 3691 ic are connected to the output of receiver 30. The transmit enable terminals (pins 3 and 6) of the 3691 i.c. are connected to a terminal labelled Q of the gate array.

The common mode voltage at the branch side of the branch isolating transformers is connected to a drive circuit 33 which applies the common mode voltage to the transformer branch sides by parallel resistors $R_{11}$ to $R_{22}$.

The logic circuit 32 is a field programmable gate array which is programmed so as normally to enable the line drivers, which are connected to the branch isolating transformers. The CM5– signal is normally low and disables the corresponding line receivers. When the CM5– signal goes high, indicating that the console is expecting reply signals from the lamps, receiver 30 is disabled and the receivers connected to the branch isolating transformers are enabled by the CM5– signal. The gate array 32 disables the drivers associated with the branch side transformers.

The gate array 32 now receives any output provided by all the receivers associated with the branch isolating transformers and tests each signal for valid data signals. Validation is carried out by the circuit shown in FIG. 3 by comparing the time between transitions in the data signals. As the data signals are FMO encoded, they contain a transition at the beginning of each bit cell with either an additional transition at the centre of a bit cell for a "zero" data bit or no centre transition for a "one" data bit. Thus the time between transitions in a valid data signal has one of only two values.

The circuit shown in FIG. 3 is one of six signal validity checkers (forming part of the gate array 32) which receive signals from the six line receivers and respectively seek to recognise valid data in such signals. The channel input signal is received at a terminal 40 and applied to a D-type flip-flop 41 and to one input of an exclusive OR gate 42 providing a clock input to the flip-flop. The other input of the exclusive OR gate 42 is connected to the Q output of the flip-flop, so that each transition (from high to low or from low to high) in the input signal is converted by the combination of the exclusive OR gate and the flip-flop to a short duration pulse. This pulse is applied to an NAND gate 43 connected as an inverter. The output of the NAND gate 43 is connected to the reset terminals of two 4-bit counters 44 and 45 which are cascaded to form a counter counting clock pulses from a clock generator running at a frequency which is a multiple of the FMO base frequency.

The pulse from the gate 42 is also supplied to the clock inputs of four flip-flops 47 to 50 which are cascaded to form a shift register. The state of the flip flop 47 is determined by the count state of the counter 45 when the gate 42 emits its pulse on detecting a transition. An array of various gates connected to the data outputs of the counter 45 are connected to control the flip-flop 47 so that its output goes high only when the count held at the transition instant represents the duration of a whole or half FMO cell. At each successive transition, the previous state of each of the flip flops 47 to 50 is passed to the next, but all of the flip-flops 47 to 50 are reset via gate 58 otherwise.

The output of the flip-flop 50 thus goes high only when three successive valid transitions have occurred. When the output of the flip-flop 50 is high, transmission from the associated receiver to the line driver 31 is enabled.

Checking of the validity of the signals on that channel continues, so that the channel can be closed as soon as an invalid transition time is detected. All of the other channels are closed, with no data validity checks being made as long as the signals on the selected channel remain valid.

Since the repeater does not start transmitting signals backwardly until three valid intervals have been detected on the currently active channel, it is necessary to include some irrelevant data signals in the data stream transmitted by each lamp before the SDLC opening flag is transmitted. These can consist of one or more SDLC "abort" sequences (i.e. seven or more "ones"), the number required depending on the number of levels of branching in the tree structure (i.e. the maximum number of repeaters the signals may have to pass through).

With the arrangement described, noise signals from all of the inactive lamp processors are not transmitted back from the repeater. Only a channel which is carrying valid data signals is enabled at any time. As the lamp processors transmit data in different time slots, the closing of all channels once a valid data channel has been detected will not give rise to any lost data. Data from each of the lamps is transmitted along a different path through the network and all the repeaters in that path recognise the valid data and allow it alone to pass. If, by some mischance, there are overlapping transmissions from two lamps units on the same truss box, the signals received on the appropriate channel of the repeater will not meet the validity test and will not be passed forward.

We claim:

1. A repeater for use in a control network comprising:

a root input/output isolating transformer, a plurality of branch input/output isolating transformers, a line receiver circuit, line driver circuits coupled to said branch input/output isolating transformers, common voltage detector means for detecting a common voltage at a root side of said root input/output isolating transformer, common voltage applying means for applying to a branch side of each of the branch input/output isolating transformers a common mode voltage determined by said common voltage detector means, normal data flow enabling means for enabling the line receiver circuit coupled to the root input/output isolating transformer and the line driver circuit directly connected to the branch input/output isolating transformers when a normal common mode voltage is detected, so that data signals received by the root input/output isolating transformer are transmitted from each of the branch input/output isolating transformers, reverse data flow enabling means for enabling the line receivers coupled to the branch isolating input/output transformers when a different common mode voltage is detected, a data signal discriminating means, coupled to the line receiver circuits for detecting valid data signals at an output of any one of the line receiver circuits coupled to the branch input/output isolating transformers, and means for enabling the line driver circuit coupled to said root input/output isolating transformer when such valid data signals are detected and for routing it to the output of the one of the line receiver circuits at which valid data signals have been detected.

2. A repeater as claimed in claim 1 in which said line receiver circuits have receive enable terminals connected directly to outputs of the common voltage detector means.

3. A repeater as claimed in claim 1 in which said data signal discriminating means comprises a logic circuit having a plurality of channels connected to respective ones of the line receiver circuits associated with the branch isolating transformers, each channel including a timing means for timing intervals between successive transitions in a received signal train, interval comparator means for determining the validity of each interval, counter means for maintaining a count of successive valid intervals and decision means for enabling output from a channel when said count achieves a predetermined number.

4. A repeater as claimed in claim 3 in which each channel also includes channel-inhibiting means for suspending operation of the channel in response to the decision means of any other channel detecting a valid interval sequence.

5. A repeater for use in a control network comprising:

a root input/output isolating transformer;

a plurality of branch input/output isolating transformers;

a line receiver circuit;

line driver circuits coupled to said branch input/output isolating transformers;

common voltage detector means for detecting a common voltage at a root side of said root input/output isolating transformer;

common voltage applying means for applying to a branch side of each of the branch input/output isolating transformers a common mode voltage determined by said common voltage detector means;

normal data flow enabling means for enabling the line receiver circuit coupled to the root input/output isolating transformer and the line driver circuit coupled to the branch input/output isolating transformers when a first common mode voltage is detected, so that data signals received by the root input/output isolating transformer are transmitted from each of the branch input/output isolating transformers;

reverse data flow enabling means for enabling the line receivers coupled to the branch isolating input/output transformers when a second common mode voltage is detected;

a data signal discriminating means for detecting data signals at an output of any one of the line receiver circuits coupled to the branch input/output isolating transformers; and means for enabling the line driver circuit coupled to said root input/output isolating transformer based on said data signals and for routing it to the output of the one of the line receiver circuits at which valid data signals have been detected.

* * * * *